United States Patent
Patel et al.

(10) Patent No.: US 10,075,304 B2
(45) Date of Patent: Sep. 11, 2018

(54) MULTIPLE GATEWAY OPERATION ON SINGLE OPERATING SYSTEM

(71) Applicant: Microsoft Technology Licensing, LLC, Redmond, WA (US)

(72) Inventors: Parveen Kumar Patel, San Jose, CA (US); Yiqun Cai, Cupertino, CA (US); Himanshu Raj, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 294 days.

(21) Appl. No.: 14/929,049

(22) Filed: Oct. 30, 2015

(65) Prior Publication Data

US 2017/0126430 A1 May 4, 2017

(51) Int. Cl.
| | | |
|---|---|---|
| *H04L 12/28* | (2006.01) | |
| *H04L 12/46* | (2006.01) | |
| *H04L 12/931* | (2013.01) | |
| *H04L 29/12* | (2006.01) | |
| *G06F 9/455* | (2018.01) | |

(52) U.S. Cl.
CPC ...... *H04L 12/4633* (2013.01); *G06F 9/45558* (2013.01); *H04L 49/70* (2013.01); *H04L 61/2038* (2013.01); *G06F 2009/45595* (2013.01); *H04L 61/6077* (2013.01)

(58) Field of Classification Search
None
See application file for complete search history.

(56) References Cited

U.S. PATENT DOCUMENTS

| | | |
|---|---|---|
| 7,088,714 B2 | 8/2006 | Athreya et al. |
| 7,668,166 B1 | 2/2010 | Yakov et al. |
| 8,259,571 B1 | 9/2012 | Raphel et al. |
| 8,613,004 B2 | 12/2013 | Hacigumus |
| 8,619,779 B2 | 12/2013 | Li et al. |
| 8,856,077 B1 | 10/2014 | Roth et al. |
| 2005/0044301 A1 | 2/2005 | Vasilevsky et al. |
| 2005/0120160 A1 | 6/2005 | Plouffe et al. |
| 2006/0092976 A1 | 5/2006 | Lakshman et al. |
| 2010/0027552 A1 | 2/2010 | Hill et al. |
| 2010/0115606 A1 | 5/2010 | Samovskiy et al. |

(Continued)

FOREIGN PATENT DOCUMENTS

| | | |
|---|---|---|
| CN | 101587577 | 11/2009 |
| CN | 102217245 | 10/2011 |

(Continued)

OTHER PUBLICATIONS

"Supplementary Search Report Received for European Patent Application No. 12853513.5", dated Jul. 20, 2015, 7 pages.

(Continued)

*Primary Examiner* — Willie J Daniel, Jr.

(74) *Attorney, Agent, or Firm* — Workman Nydegger (57) ABSTRACT

A multi-gateway virtual machine that operates multiple gateways. Each gateway acts as an interface between a virtual network and entities outside of the virtual network. Each virtual network has its own address space, which may be overlapping with the address space of other virtual networks, even if the gateways of those virtual networks are operating on the same virtual machine. Accordingly, the principles described herein relate to a virtual machine that can operate thereon multiple gateways, and thus to a multi-gateway virtual machine that services multiple virtual networks.

20 Claims, 7 Drawing Sheets

(56) References Cited

U.S. PATENT DOCUMENTS

| | | |
|---|---|---|
| 2010/0228974 A1 | 9/2010 | Watts et al. |
| 2011/0016473 A1 | 1/2011 | Srinivasan |
| 2011/0022812 A1 | 1/2011 | van der Linden et al. |
| 2011/0075667 A1 | 3/2011 | Li et al. |
| 2011/0075674 A1 | 3/2011 | Li et al. |
| 2011/0090911 A1 | 4/2011 | Hao et al. |
| 2011/0126197 A1 | 5/2011 | Larset et al. |
| 2011/0134932 A1 | 6/2011 | Gooch et al. |
| 2011/0261828 A1 | 10/2011 | Smith |
| 2011/0265077 A1 | 10/2011 | Collison et al. |
| 2011/0274108 A1 | 11/2011 | Fan |
| 2012/0163388 A1 | 6/2012 | Goel et al. |
| 2012/0300615 A1 | 11/2012 | Kempf et al. |
| 2013/0142201 A1 | 6/2013 | Kim et al. |
| 2013/0227672 A1 | 8/2013 | Ogg et al. |
| 2014/0086253 A1 | 3/2014 | Yong |
| 2014/0115587 A1 | 4/2014 | Modigonda et al. |
| 2014/0226492 A1 | 8/2014 | Brandwine et al. |
| 2014/0254590 A1 | 9/2014 | Yang et al. |
| 2015/0003463 A1 | 1/2015 | Li et al. |
| 2015/0163323 A1 | 6/2015 | Moreno et al. |

FOREIGN PATENT DOCUMENTS

| | | |
|---|---|---|
| WO | 03107604 | 12/2003 |
| WO | 2004102890 | 11/2004 |

OTHER PUBLICATIONS

Andersson, "Provider Provisioned Virtual Private Network (VPN) Terminology", Mar. 2005.
Tate, et al., "IBM j-type Data Center Networking Introduction", Available at least as early as May 2010, 286 pages.
"First Office Action and Search Report Issued in Chinese Patent Application No. 201210507040.6", dated Apr. 24, 2015, 11 pages.
Sridharan, et al. "NVGRE: Network Visualization using Generic Routing Encapsulation, IETF", Sep. 2011.
Mudigonda, et al., "NetLord: A Scalable Multi-Tenant Network Architecture for Virtualized Datacenters", In Proceedings of ACM SIGCOMM Conference, Aug. 15-19, 2011, 12 pages.
International Search Report and Written Opinion issued in PCT International Search Report and Written Opinion issued in PCT Application No. PCT/US2016/059489, dated Feb. 2, 2017.
Armbrust et al., "Above the Clouds: A Berkeley View of Cloud Computing," Technical Report No. UCB/EECS-2009/28, UC Berkeley Reliable Adaptive Distributed Systems Laboratory, http://www.eecs.berkeley.edu/Pubs/TechRpts/2009/EECS-2009-28.html, Feb. 10, 2009.
Doddavula et al., "Adopting Cloud Computing: Enterprise Private Clouds," SETLabs Briefings, vol. 7, No. 7, 2009.
U.S. Appl. No. 13/650,750, Nov. 2, 2015, Office Action.
U.S. Appl. No. 13/650,750, Jul. 24, 2015, Office Action.
U.S. Appl. No. 13/650,750, Feb. 6, 2015, Office Action.
U.S. Appl. No. 13/650,750, Apr. 21, 2014, Office Action.

MULTIPLE GATEWAY OPERATION ON SINGLE OPERATING SYSTEM

BACKGROUND

Computing systems and associated networks have provided technical capabilities that have revolutionized the way human beings work, play, and communicate, providing fundamental support for the information age. Nearly every aspect of our lives is affected in some way by computing systems. The proliferation of networks has allowed computing systems to share data and communicate, vastly increasing information access.

Networking technology is founded upon the ability to assign addresses to each device in a network, and on the ability to route messages between those devices using the assigned addresses. Virtual networks operate using an additional layer of abstraction on top of the physical addresses that allow the complexity of the underlying physical networks to be hidden to virtual network nodes so that addressing may be more simplified.

Virtual networks are not limited to having physical machines as nodes. For instance, nodes of a virtual network may be virtual entities, such as virtual machines. The virtual addresses of the virtual nodes in a virtual network thus need not match the physical address of the physical machine that supports the virtual node. Furthermore, between each node in a virtual network is a virtual link. From the perspective of a node on the virtual network, the virtual link is a straightforward link. However, from the physical perspective, the link may be quite simple, but may also be quite complex, invoking physical gateways, routers, bridges, and so forth. Thus, a virtual network appears to each node in the virtual network as being within the same network, but the virtual network is abstracted over the physical enabling technologies, and thus the virtual network may span one or many physical networks. Virtual networks are, for instance, used to connect virtual machines belonging to a single tenant of a cloud computing environment.

In order to allow interaction between the virtual network and nodes outside of the outside world, a gateway is typically used. The gateway receives packets from outside of the virtual network and that are destined for nodes within the virtual network, and sends packets from inside of the virtual network to outside of the virtual network. Of course, the gateway is not needed for packets that are both sent and received within the virtual network.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least one embodiment described herein relates to a multi-gateway machine that operates multiple gateways on a single operating system, whether that operating system be operating on a physical machine or in a virtual machine. Each gateway acts as an interface between a virtual network and entities outside of the virtual network. Each virtual network has its own address space, which may be overlapping with the address space of other virtual networks, even if the gateways of those virtual networks are operating on the same virtual machine. Accordingly, the principles described herein relate to a machine that can operate thereon multiple gateways on a single operating system, and thus to a multi-gateway machine that services multiple virtual networks.

In order to receive a packet into one of the virtual networks, the multi-gateway machine accesses a corresponding encapsulated packet received from outside of the virtual networks that are served by the multi-gateway machine. The encapsulated packet contains a virtual network identifier corresponding to one of the multiple virtual networks for which there is a corresponding gateway operating on the multi-gateway machine. The multi-gateway machine also decapsulates the encapsulated packet. For instance, the virtual network identifier may have been included in the encapsulation of the packet. The multi-gateway machine then identifies the virtual network based on the virtual network identifier, and then delivers the decapsulated packet to the corresponding gateway running for the identified virtual network.

In order to send a packet out of the virtual networks, the multi-gateway machine accesses the packet from a gateway running for a corresponding virtual network. The multi-gateway machine identifies the corresponding virtual network, and encapsulates the packet so as to include a virtual network identifier of the corresponding virtual network. The multi-gateway machine then dispatches the encapsulated packet.

Accordingly, multiple gateways may be operated within a single machine. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

At least one embodiment described herein relates to a multi-gateway machine that operates multiple gateways on a single operating system, whether that operating system be operating on a physical machine or in a virtual machine. Each gateway acts as an interface between a virtual network and entities outside of the virtual network. Each virtual network has its own address space, which may be overlapping with the address space of other virtual networks, even if the gateways of those virtual networks are operating on the same virtual machine. Accordingly, the principles described herein relate to a machine that can operate thereon multiple gateways on a single operating system, and thus to a multi-gateway machine that services multiple virtual networks.

In order to receive a packet into one of the virtual networks, the multi-gateway machine accesses a corresponding encapsulated packet received from outside of the virtual networks that are served by the multi-gateway machine. The encapsulated packet contains a virtual network identifier corresponding to one of the multiple virtual networks for which there is a corresponding gateway operating on the multi-gateway machine. The multi-gateway machine also decapsulates the encapsulated packet. For instance, the virtual network identifier may have been included in the encapsulation of the packet. The multi-gateway machine then identifies the virtual network based on the virtual network identifier, and then delivers the decapsulated packet to the corresponding gateway running for the identified virtual network.

In order to send a packet out of the virtual networks, the multi-gateway machine accesses the packet from a gateway running for a corresponding virtual network. The multi-gateway machine identifies the corresponding virtual network, and encapsulates the packet so as to include a virtual network identifier of the corresponding virtual network. The multi-gateway machine then dispatches the encapsulated packet.

Accordingly, multiple virtual network gateways may operate on the same machine and on the same operating system. Some introductory discussion of a computing system will be described with respect to FIG. 1. Then, the multi-gateway machine architecture and operation will be described with respect to subsequent drawings.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor to thereby provision the computing system for a special purpose. The memory may take any form and may depend on the nature and form of the computing system. A computing system may be distributed over a network environment and may include multiple constituent computing systems.

Figure 1:
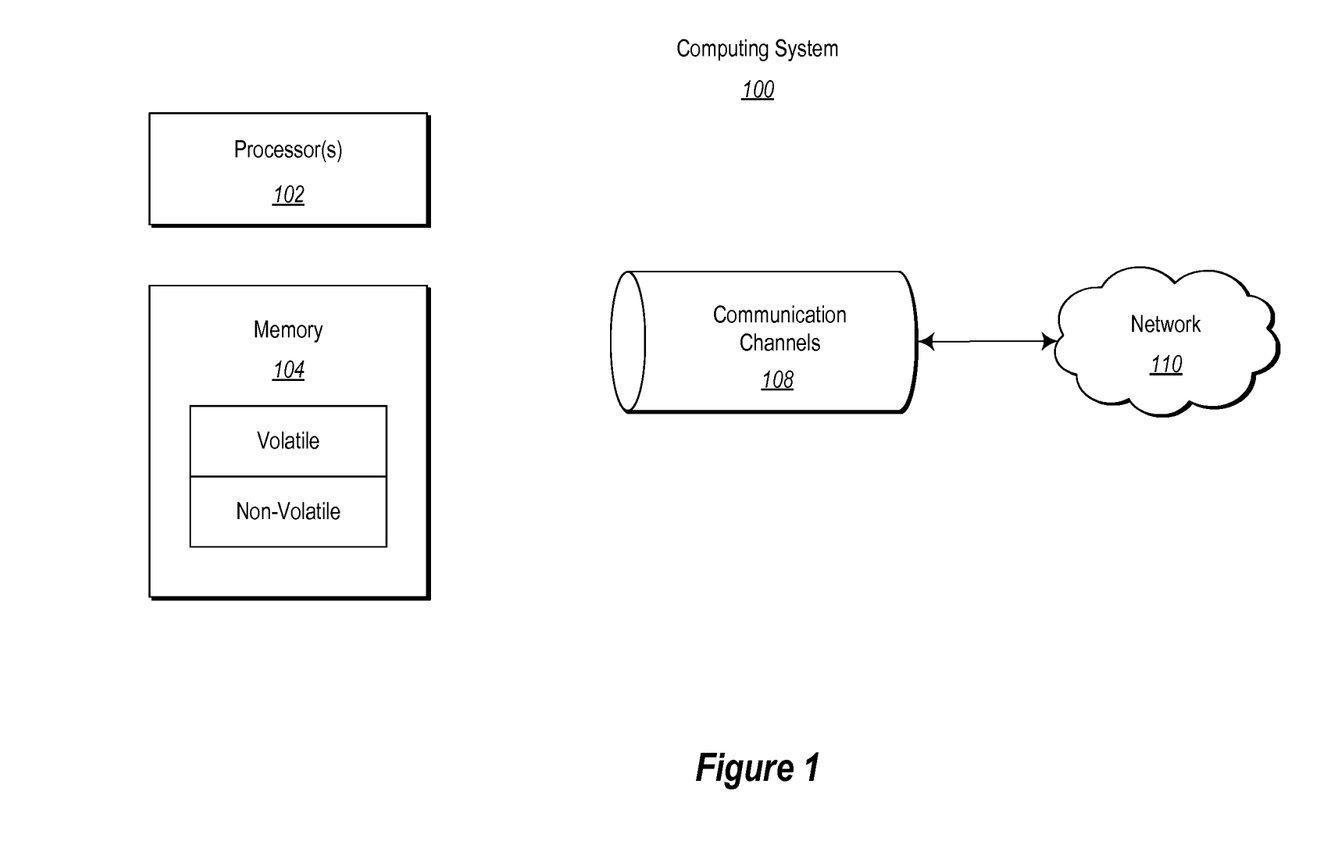
FIG. 1 abstractly illustrates a computing system in which some embodiments described herein may be employed.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routines, or methods that may be executed on the computing system. The different components, modules, engines, and services described herein may be implemented as objects or processes that execute on the computing system (e.g., as separate threads). With such objects and processes operating upon the computing system, the computing system is the equivalent of a special purpose computer that functions for the special purpose accomplished by the objects.

In the description that follows, embodiments are described with reference to acts that are performed by one or more computing systems. If such acts are implemented in software, one or more processors (of the associated computing system that performs the act) direct the operation of the computing system in response to having executed computer-executable instructions, thereby converting and configuring the computing system for a more specialized purpose than without such direction. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other computing systems over, for example, network 110.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. The computer executable instructions may be, for example, binaries or even instructions that undergo some translation (such as compilation) before direct execution by the processors, such as intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses, watches, and so forth) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Figure 2:
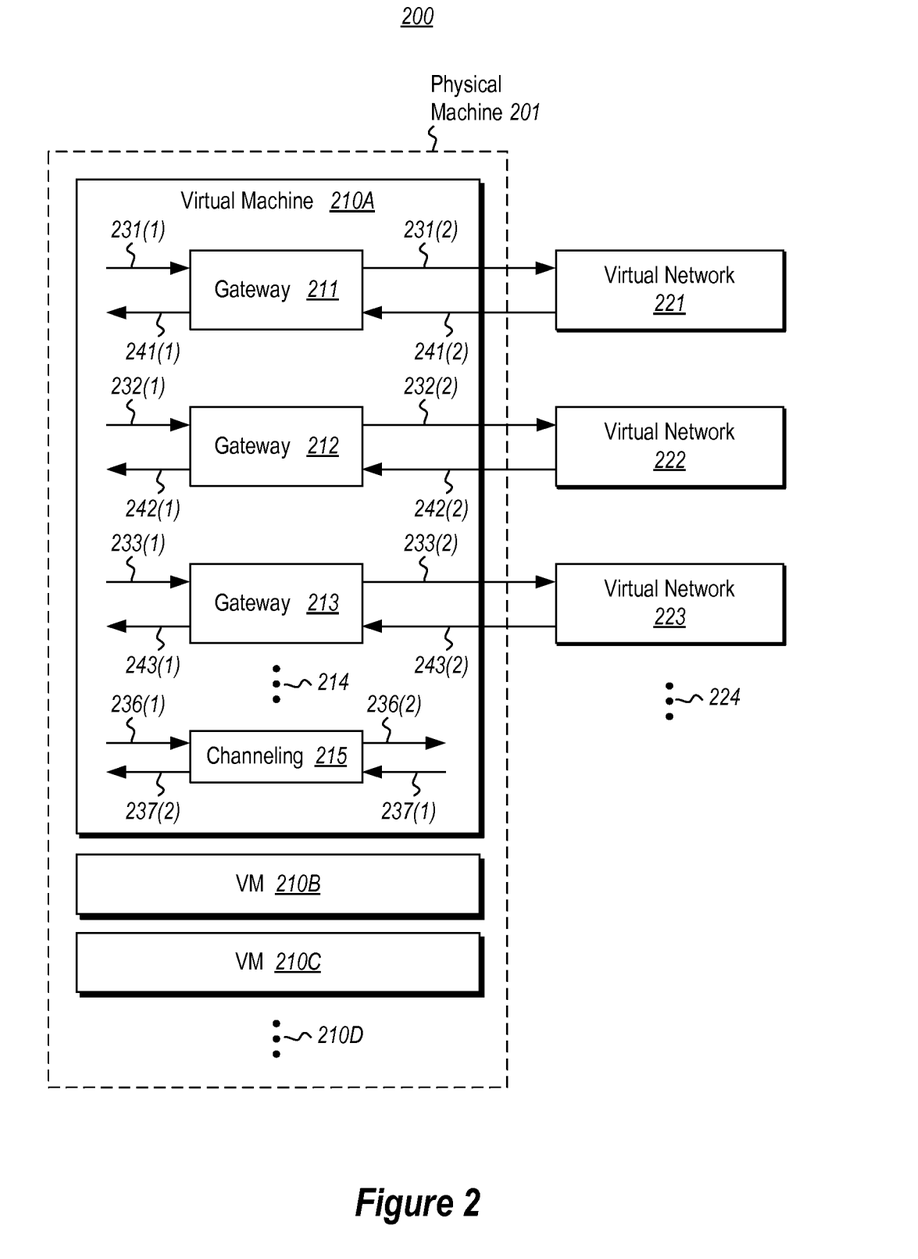
FIG. 2 symbolically illustrates a system that includes a multi-gateway machine (in this case a virtual machine) that operates thereon multiple gateways operating for respective virtual networks.

FIG. 2 illustrates a system 200 that includes a multi-gateway virtual machine 210A that operates thereon multiple gateways operating for respective virtual networks. Accordingly, the multi-gateway virtual machine 210 operates gateways for multiple virtual networks. Rather than being a multi-gateway virtual machine that has an operating system running over a hypervisor, the principles described herein are equally applicable to a physical machine that directly runs the operating system that operates the multiple gateways. In any case, this description will describe the example of the machine being a virtual machine, though the broader principles are not limited to implementation on a virtual machine, but may be implemented directly on a physical machine.

The multi-gateway virtual machine 210 operates on a physical machine 201 for underlying physical support. The physical machine 201 may, for instance, be any computing system capable of processing, and operating thereon a virtual machine. As an example, the physical machine 201 may be embodied by the computing system 100 described with respect to FIG. 1. Of course, as mentioned above, the physical form of the computing system 100 may be quite varied, and the multiple gateways 211 through 215 may instead run directly on the physical machine 201 without the use of the virtual machine 210A.

As mentioned above, the virtual machine 210A provides multiple gateways. For instance, (as represented by arrows 231(1) and 231(2)) gateway 211 channels packets that are received into the virtual network 221 from sources external to the virtual network 221, and (as represented by arrows 241(1) and 241(2)) sends packets that are transmitted from sources internal to the virtual network 221 for routing outside of the virtual network 221. Likewise, (as represented by arrows 232(1) and 232(2)) gateway 212 channels packets that are received into the virtual network 222 from sources external to the virtual network 222, and (as represented by arrows 242(1) and 242(2)) sends packets that are transmitted from sources internal to the virtual network 222 for routing outside of the virtual network 222. Finally, (as represented by arrows 233(1) and 233(2)) gateway 213 channels packets that are received into the virtual network 223 from sources external to the virtual network 223, and (as represented by arrows 243(1) and 243(2)) sends packets that are transmitted from sources internal to the virtual network 223 for routing outside of the virtual network 223. The ellipses 214 symbolically represent that the multi-gateway virtual machine 210A may include any plural (two or more) number of gateways, each serving as a gateway for a corresponding virtual network as represented by ellipses 224.

There is performance isolation control of traffic for different virtual networks. In other words, the processing capacity allocated to any virtual network can be controlled. Various forms of policy can be implemented. For instance, the policy might provide fixed processing capacity to each virtual network, or perhaps only provide a maximum or minimum capacity to each virtual network.

In some embodiments, the system 200 may be implemented by a computing system (such as a computing system 100) that is configured through operation of the one or more processors (such as processor(s) 102) executing computer-executable instructions specially structured to as to instantiate and/or operate the multi-gateway virtual machine as described herein. As an example, the multi-gateway virtual machine may be operated within a cloud computing environment.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

As previously mentioned, the system 200 has a physical machine 201 that has operating thereon a multi-gateway virtual machine 210. Although this might be the only multi-gateway virtual machine 210A operating on the physical machine 201, there may alternatively be multiple instances 210A, 210B and 210C of the multi-gateway virtual machine(s) 210 operating on the physical machine 201, though the virtual machine 210A is illustrated with the greatest degree of detail. The ellipses 210D represent that there may be any number of instances of the multi-gateway virtual machine 210A in operation. For instance, multiple instances may be used in order to perform load balancing. In that case, perhaps the instances of the multi-gateway virtual machine 210 are the same in that they each have gateways that serve the same set of virtual networks 221, 222 and 223.

However, even without perfect identity of the virtual networks served for each instance of the virtual machine, multiple instances of the virtual machine may still provide load balancing benefits. Accordingly, the principles described herein are not limited to the multiple instances of the multi-gateway virtual machines all have gateways that serve the same set of virtual networks. That said, the principles described herein are not even limited to embodiments in which there are multiple virtual machines operating to perform the gateway function.

The multi-gateway virtual machine operates to receive packets into the virtual networks as well as send packets from the virtual networks. The receive and send operations may be performed with the aid of a channeling module 215 present on the physical machine 201. For instance, in receiving a packet, the channeling module may receive a packet (as represented by arrow 236(1), preparing the packet, and dispatch the packet (as represented by arrow 236(2)) to the appropriate gateway. Likewise in sending a packet, the channeling module 215 may receive a packet (as represented by arrow 237(1), prepare the packet, and dispatch the packet (as represented by arrow 237(2)) to the appropriate location outside of the virtual network. Each of the receive and send operations will now be described in further detail. Although not required, the channeling module 215 and the gateways 211 through 214 may be performed as a single component, as separate components, or combinations thereof.

Figure 3:
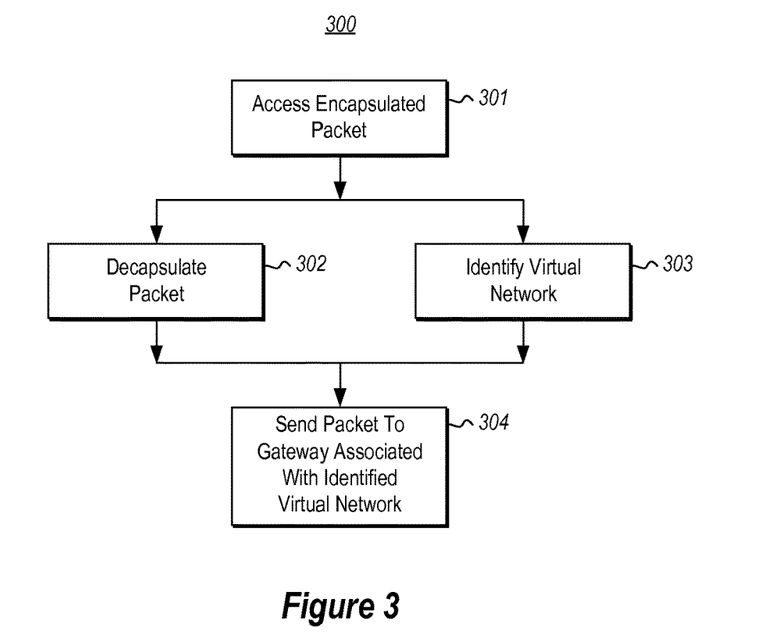
FIG. 3 illustrates a flowchart of a method for receiving a packet into a suitable virtual network.

FIG. 3 illustrates a flowchart of a method for receiving a packet into a suitable virtual network. The multi-gateway virtual machine accesses (act 301) a corresponding encapsulated packet that contains a virtual network identifier. The virtual network identifier corresponds to one of the multiple virtual networks 221, 222, 223, 224 for which there is a corresponding gateway operating on the multi-gateway virtual machine. For instance, FIG. 4A symbolically illustrates an example structure of such a received packet 400 in the state 400A in which it is just received (as represented by arrow 236(1)) by the virtual machine 210A. The packet 400A includes a physical header 420, a virtual header (the inner header), and a payload 401). The physical header 420 is also illustrated as including a virtual network identifier 421. The virtual header 420 is used for routing of the packet within the corresponding virtual network.

Figure 4A:
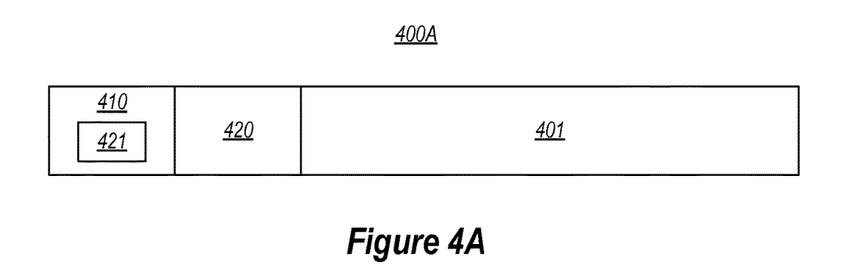
FIG. 4A symbolically illustrates an example structure of a packet in the state in which it is encapsulated and includes a virtual network identifier.
Figure 4B:
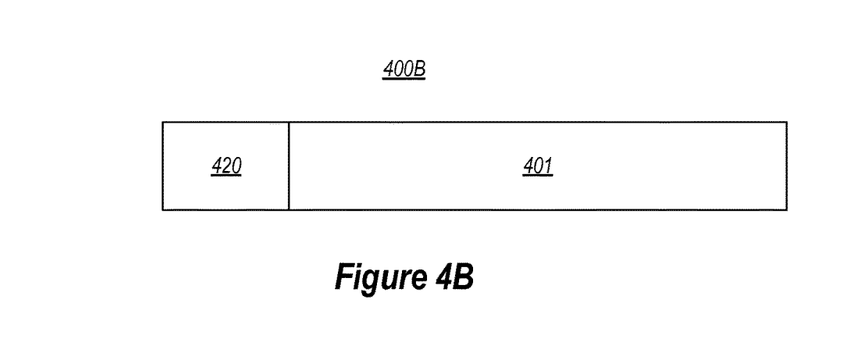
FIG. 4B symbolically illustrates an example structure of a packet in the state in which it is decapsulated.

The multi-gateway virtual machine 210A (e.g., the channeling module 215) then decapsulates the encapsulated packet (act 302) and also identifies the virtual network based on the virtual network identifier (act 303). The decapsulation (act 302) and the identification of the virtual network (act 303) are shown in parallel only to symbolize that there is no temporal dependency between these two acts. The decapsulation may be performed first, the identification of the virtual network may be performed first, and/or the two acts may be performed at least in part concurrently. The same may be said of any acts that are illustrated as occurring in parallel. FIG. 4B illustrates the packet 400 in a subsequent decapsulated state. Now there is just the virtual header 420 and the payload 401. In some embodiments, the virtual network identifier 421 may be included within the state 400A of the packet of FIG. 4A in any location, so long as the state 400B of the packet 400 of FIG. 4B is produced by the multi-gateway virtual machine 410A (e.g., by the channeling module 415).

The multi-gateway virtual machine (e.g., the channeling module 415) then delivers (act 304) the decapsulated packet to the corresponding gateway running for the identified virtual network (act 304). For instance, if the virtual network identified in act 303 is the virtual network 221, then the channeling module 215 dispatches the decapsulated packet to the gateway 211 as represented by arrows 236(2) and 231(1). If the virtual network identified in act 303 is the virtual network 222, then the channeling module 215 dispatches the decapsulated packet to the gateway 211 as represented by arrows 236(2) and 232(1). If the virtual network identified in act 303 is the virtual network 223, then the channeling module 215 dispatches the decapsulated packet to the gateway 211 as represented by arrows 236(2) and 233(1). Once at the gateway, the virtual header may be used for further routing.

Figure 5:
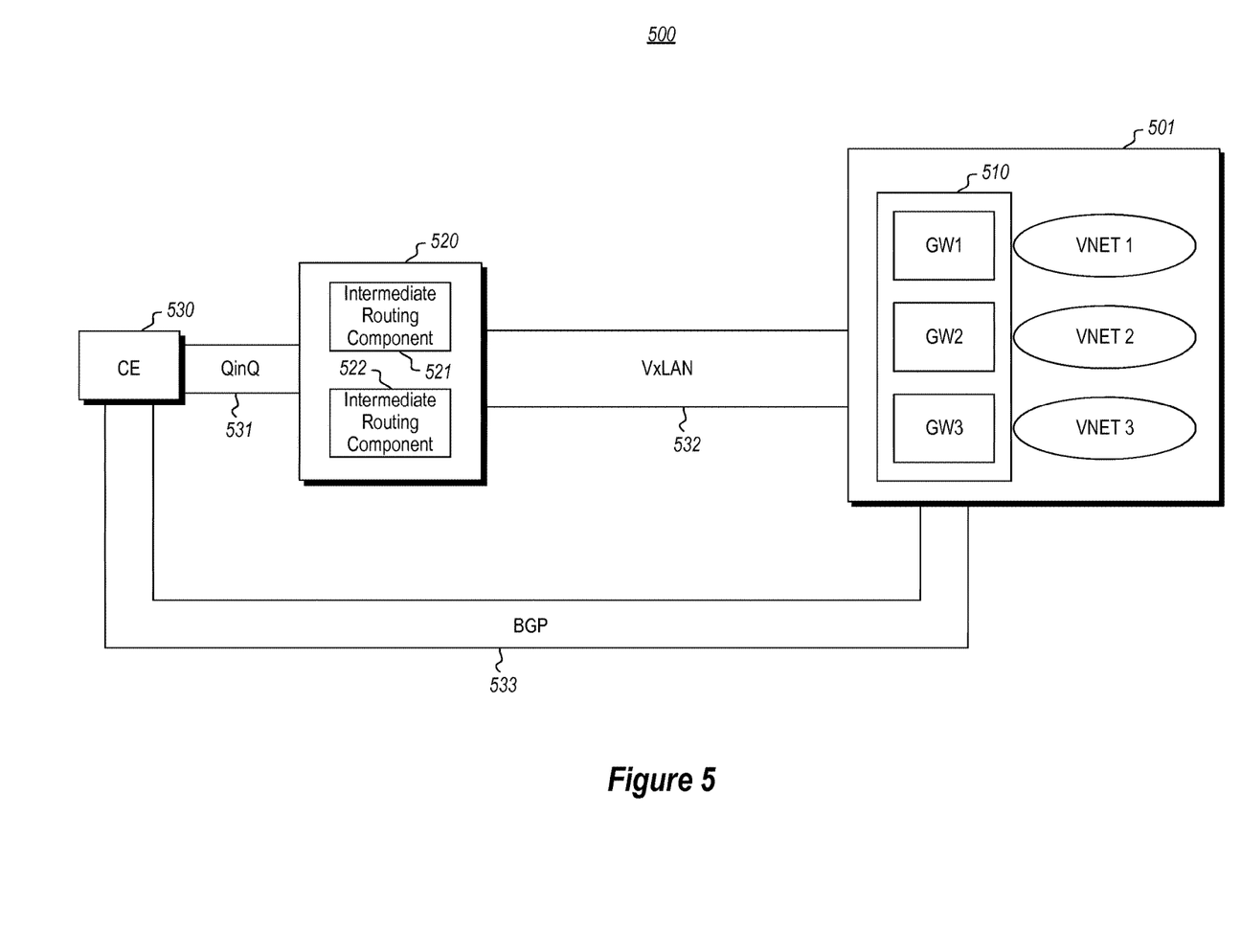
FIG. 5 illustrates a larger system in which a portion represents a more detailed example of the system of FIG. 2.

FIG. 5 illustrates a larger system 500 in which a portion 501 represents a more detailed example of the system 200 of FIG. 2. In this example, there are again three virtual networks named VNet1, VNet2, and VNet3, which are examples of corresponding virtual networks 221, 222 and 213 of FIG. 2. Furthermore, there are three gateways GW1, GW2 and GW3, which are examples of corresponding gateways 211, 212 and 213 of FIG. 2. Component 510 is an example of the multi-gateway virtual machine 210A of FIG. 2.

Figure 6:
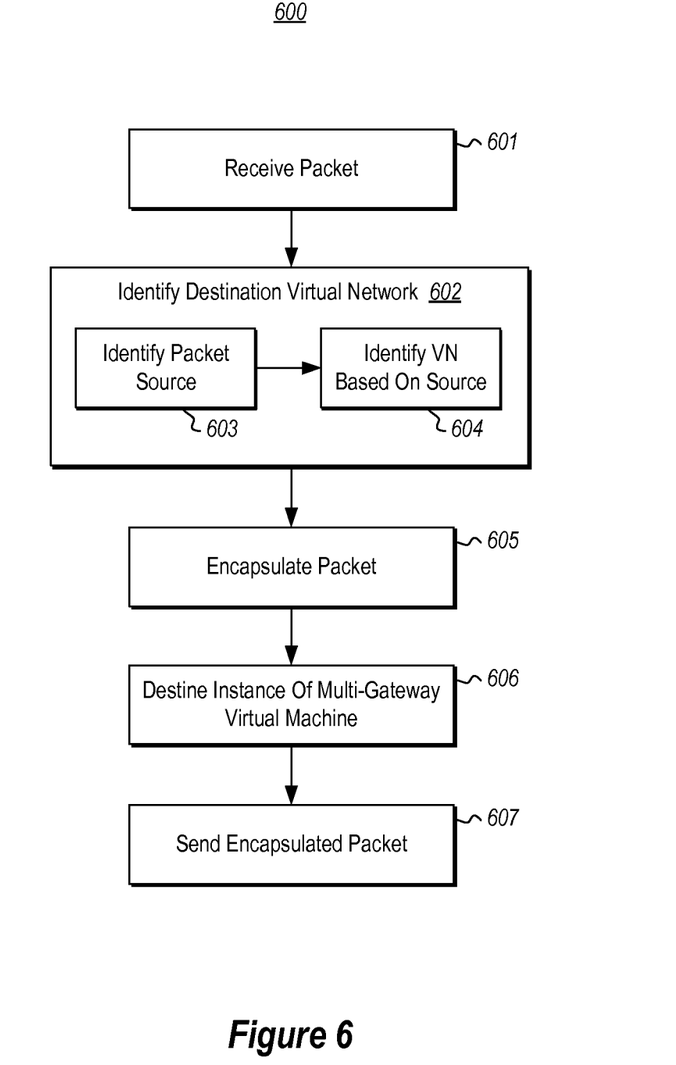
FIG. 6 illustrates a flowchart of a method for the intermediary routing component to operate to encapsulate and include a virtual network identifier.

However, in this larger system, there is an intermediary routing component 520 that is illustrated. This intermediary routing component 520 may be responsible for preparing packets destined from a particular network endpoint 530 that is destined for a location within one of the virtual networks VNet1, VNet2, or VNet3. In particular, the intermediary routing component 520 may have inserted the virtual network identifier field 421 within the encapsulated packet 400B of FIG. 4B. FIG. 6 illustrates a flowchart of a method 600 for the intermediary routing component 520 to operate to do that.

FIG. 6 illustrates a flowchart of a method 600 for generating the encapsulated packet. The intermediary routing component first access the received packet (act 601). For instance, the packet may be received by the intermediary routing component 520 from the network endpoint 530. In this example, this is performed over a channel 531. In one embodiment, this channel 531 is a QinQ channel in which the Media Access Control (MAC) address of the network endpoint 530 is discoverable by the intermediary routing component 520. The packet may at this point have the state 400B of FIG. 4B. In other words, the packet is not yet encapsulated.

The intermediary component then identifies a destination virtual network for the received packet (act 602). As an example, this identification may be based on an identification of a source (e.g., the MAC address) of the received packet (act 603). The virtual network is then identified based on the source identified (act 604). For instance, the intermediary component 520 may maintain a mapping between MAC addresses and corresponding virtual networks.

The intermediary routing component 520 then encapsulating the received packet so as to deliverable to at least one instance of the multi-gateway virtual machine and so as to include the virtual network identifier corresponding destination virtual network (act 605). As part of this encapsulation, the virtual network identifier 421 is included. Thus, the packet at this point may have the state 400A of FIG. 4A.

The intermediary routing component then destines one of multiple instances of the multi-gateway virtual machines to provide the encapsulated packet to (act 606). As an example, the intermediary component may destine any one of the multiple instances 210A, 210B, 210C (and so forth 210D) to send the encapsulated packet to, so long as any one of those multi-gateway virtual machines 210 can act as a gateway from the virtual network identified by virtual network identifier. This act is optional as there may not even be multiple instances of the multi-gateway virtual machine in operation. Furthermore, even if there were multiple instances of the multi-gateway virtual machine in operation, this selection (act 606) may be optional to (or might not be performed by) the intermediary routing module 520, as the load balancing might be performed by a front-end of the multi-gateways virtual machine 210.

The encapsulated packet is then sent to the instance of the multi-gateway virtual machine (act 607). For instance, in FIG. 5, the intermediary routing component 520 may then send the encapsulated packet to the virtual machine 501 over the channel 532, an example of which being a VxLAN channel. The channel 533 represents a logical channel leading from the network endpoint 530 to the virtual machine 501. In one example, the components performing acts 602 through 606 of the method 600 may be the intermediate routing components 521 or 522.

Figure 7:
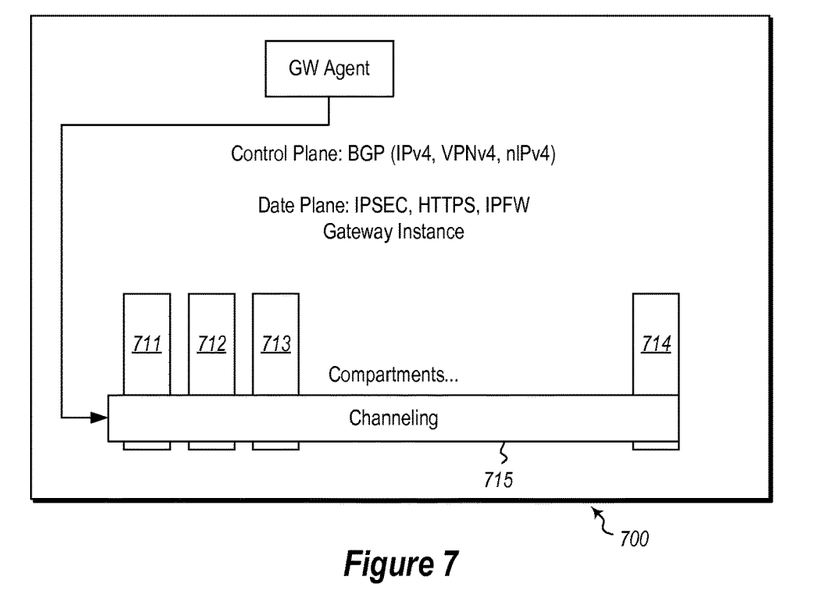
FIG. 7 illustrates a more details example of the physical machine of FIG. 2.

FIG. 7 illustrates a more details example 701 of the physical machine 201 of FIG. 2. In this example, the channeling module 715 serves as an example of the channeling module 215 of FIG. 2. The channeling module 715 has associated therewith a compartment module 711 through 714 associated with each of the virtual networks. The compartment modules 711 through 714 are each configured to detect when a received packet includes a virtual network identifier corresponding to its virtual network, and removes the virtual network identifier (act 303), and channels the decapsulated packet to the appropriate gateway for that virtual network (act 304).

The sending of a packet from a location internal to a virtual network to a location outside of the virtual network will now be described. When such a packet is sent from within a corresponding virtual machine, the packet may be routed directly to one of the intermediate routing components 521 or 522. Alternatively, the packet may be routed to the corresponding gateway using the virtual header. Accordingly, in this routing process, the packet has the state 400B of FIG. 4B. For instance, if the packet comes from the virtual network 221, the gateway 211 receives the packet as represented by arrow 241(2). If the packet comes from the virtual network 222, the gateway 212 receives the packet as represented by arrow 242(2). If the packet comes from the virtual network 223, the gateway 213 receives the packet as represented by arrow 243(2).

Figure 8:
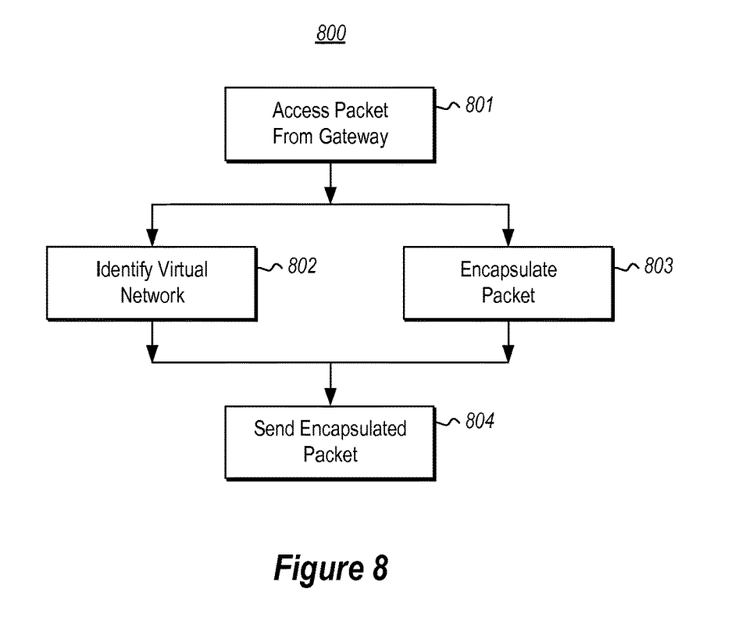
FIG. 8 illustrates a flowchart of a method for each of at least some of the packets to be sent by the multi-gateway machine.

FIG. 8 illustrates a flowchart of a method 800 for each of at least some of the packets to be sent by the multi-gateway virtual machine. First, the multi-gateway virtual machine accesses a packet from a gateway (act 801). The packet may, for instance, take the state 400B of the packet of FIG. 4B. If the packet comes from the virtual network 221, the channeling module 215 receives the packet as represented by arrows 241(1) and 237(1). If the packet comes from the virtual network 221, the channeling module 215 receives the packet as represented by arrows 242(1) and 237(1). If the packet comes from the virtual network 223, the channeling module 215 receives the packet as represented by arrows 243(1) and 237(1). Referring to FIG. 7, each of the compartments 711 through 714 may be responsible for receiving the packet from a corresponding gateway.

The multi-gateway virtual machine then identifies the corresponding virtual network (act 802), and encapsulates the packet so as to include the corresponding virtual network identifier (act 803). Referring to FIG. 7, each of the compartments 711 through 714 may be responsible for inserting the corresponding virtual network identifier into the encapsulated packet and/or encapsulating the packet so as to include the corresponding virtual network identifier. At this point, the encapsulated packet may have the state 400A that is illustrated in FIG. 4A. This allows the compartments to be relatively simple to operate, and allow the overall channeling module 215 to scale by addition of further compartment components.

Figure 9:
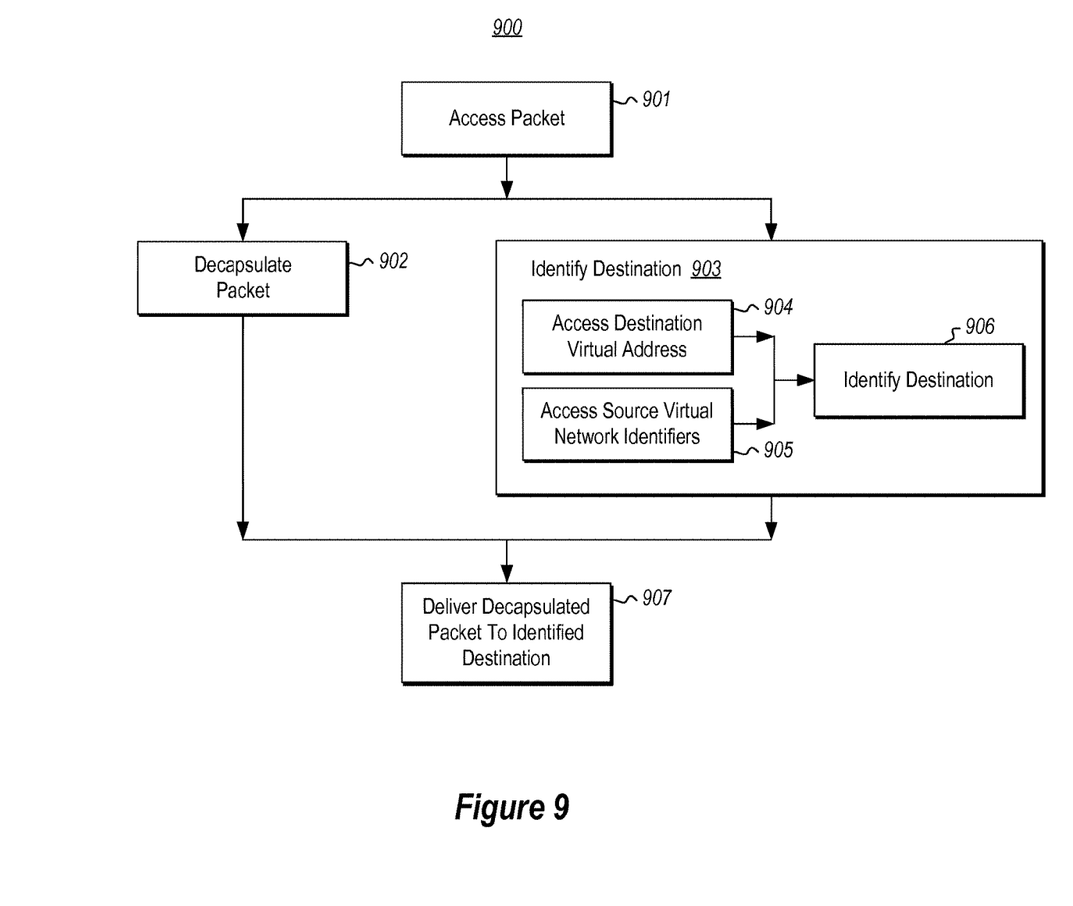
FIG. 9 illustrates a flowchart of a method for decapsulating a sent packet to deliver to an external network node.

The multi-gateway virtual machine then dispatches the encapsulated packet towards its destination (act 804). In FIG. 2, this is represented by arrow 237(2). In FIG. 5, for example, the encapsulated packet may be received by the intermediary component 520. The intermediary routing component may perform the reverse of the process illustrated in FIG. 6. For instance, FIG. 9 illustrates a flowchart of a method 900 for decapsulating the sent packet to deliver to an external network node.

Upon accessing the encapsulated packet (act 901), the intermediary component decapsulates the packet (act 902) and identifies the destination (act 903). For instance, the intermediary node accesses (act 904) the destination virtual address specified in the received packet, and the source virtual network (act 905), and uses the mapping to identify the destination (act 906). For instance, the destination virtual address and source virtual network may be mapped to a particular MAC address. The intermediary component then delivers (act 907) the decapsulated packet (which now has state 400B of FIG. 4B) to the destination (e.g., destination 530).

Accordingly, the principles described herein allow a single virtual machine to efficiently operate multiple gateways, for multiple virtual machines. Furthermore, the address space of the virtual networks may even overlap as disambiguation is performed by using virtual network identifier. Also, the virtual machine may be scaled well by having compartment components assigned to each virtual network perform much of the processing for that virtual network.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
   one or more processors; and
   one or more computer-readable storage media having stored thereon computer-executable instructions that are executable by the one or more processors to cause the computing system to create and/or operate a multi-gateway virtual machine that operates multiple gateways on the multi-gateway virtual machine, each of the multiple gateways operating for a respective virtual network such that the multi-gateway virtual machine operates gateways for a plurality of virtual networks, execution of the computer-executable instructions causing the computing system to perform a method comprising the following for each of at least some packets that are received at the multi-gateway virtual machine:
      an act of the multi-gateway virtual machine accessing a corresponding encapsulated packet that includes a virtual network identifier corresponding to one of the plurality of virtual networks for which there is a corresponding gateway operating on the multi-gateway virtual machine, wherein the packet is subject to a policy associated with the one virtual network, the policy requiring satisfaction of a performance isolation control for the one virtual network;
      an act of the multi-gateway virtual machine decapsulating the encapsulated packet;
      an act of the multi-gateway virtual machine identifying the one virtual network based on the virtual network identifier; and
      an act of the multi-gateway virtual machine delivering the decapsulated packet to the corresponding gateway running for the identified one virtual network, wherein delivering the decapsulated packet is performed after determining that the one virtual network's performance isolation control is satisfied.

2. The computing system in accordance with claim 1, wherein the computing system instantiates and/or operates multiple instances of the multi-gateway virtual machine.

3. The computing system in accordance with claim 2, wherein each of the multiple instances of the multi-gateway virtual machine corresponds to a same set of virtual networks.

4. The computing system in accordance with claim 1, wherein the computing system instantiates and/or operates one instance of the multi-gateway virtual machine.

5. The computing system in accordance with claim 1, the method further comprising the following for the encapsulated packet accessed at the multi-gateway virtual machine:
   an act of formulating the encapsulated packet, the act of formulating the encapsulated packet comprising:
      an act of accessing a received packet;
      an act of identifying a destination virtual network for the received packet;
      an act of encapsulating the received packet so as to be deliverable to the multi-gateway virtual machine and so as to include the virtual network identifier corresponding the destination virtual network; and
      an act of providing the encapsulated packet to the multi-gateway virtual machine.

6. The computing system in accordance with claim 5, the act of identifying the destination virtual network for the received packet comprising:
   an act of identifying a source of the received packet, wherein the act of identifying the destination virtual network is based on the identified source of the received packet.

7. The computing system in accordance with claim 5, the act of providing the encapsulated packet to the multi-gateway virtual machine comprising:
   an act of sending the encapsulated packet to the multi-gateway virtual machine.

8. The computing system in accordance with claim 5, wherein there are multiple instances of the multi-gateway virtual machine, each of the multiple instances of the multi-gateway virtual machine being configured to deliver packets to the destination virtual network, the method further comprising:
   an act of selecting one of the multiple instances of the multi-gateway virtual machine to provide the encapsulated packet to.

9. The computing system in accordance with claim 1, wherein the multi-gateway virtual machine further includes a compartment module, the compartment module being configured such that it includes an established relationship with each of the multiple gateways, wherein the compartment module is also configured to remove the virtual network identifier during the decapsulating of the encapsulated packet that is destined for the one virtual network, the one virtual network having been identified by the virtual network identifier, and wherein the compartment module is further configured to perform the act of the multi-gateway virtual machine delivering the decapsulated packet to the corresponding gateway running for the identified one virtual network.

10. A computing system comprising:
    one or more processors; and
    one or more computer-readable storage media having stored thereon computer-executable instructions that are executable by the one or more processors to cause the computing system to create and/or operate a multi-gateway virtual machine that operates multiple gateways on the multi-gateway virtual machine, each of the multiple gateways operating for a respective virtual network such that the multi-gateway virtual machine operates gateways for a plurality of virtual networks, execution of the computer-executable Instructions causing the computing system to perform a method comprising the following for each of at least some packets that are sent by the multi-gateway virtual machine:
       an act of the multi-gateway virtual machine accessing a packet received from a gateway that is running for a corresponding virtual network, the corresponding virtual network having associated therewith a policy that requires satisfactions of a performance isolation control;
       an act of the multi-gateway virtual machine identifying the corresponding virtual network;
       an act of the multi-gateway virtual machine encapsulating the packet so as to include a virtual network identifier of the corresponding virtual network; and
       an act of the multi-gateway virtual machine dispatching the encapsulated packet.

11. The computing system in accordance with claim 10, wherein the computing system instantiates and/or operates multiple instances of the multi-gateway virtual machine.

12. The computing system in accordance with claim 11, each of at least some of the multiple instances of the multi-gateway virtual machine corresponds to a same set of virtual networks.

13. The computing system in accordance with claim 12, the computing system configured to select one of the multiple instances of the multi-gateway virtual machine to perform the method.

14. The computing system in accordance with claim 13, the selection being performed so as to improve load balancing of the multiple instances of the multi-gateway virtual machine.

15. The computing system in accordance with claim 10, wherein the computing system instantiates and/or operates one instance of the multi-gateway virtual machine.

16. The computing system in accordance with claim 10, the method further comprising the following for the encapsulated packet dispatched by the multi-gateway virtual machine:
an act of accessing the dispatched encapsulated packet;
an act of identifying the corresponding virtual network, which is the source of the dispatched packet;
an act of decapsulating the dispatched encapsulated packet to discover a destination network address within an address space of the corresponding virtual network; and
an act of delivering the decapsulated packet to a destination entity using the virtual network identifier and the destination network address within the address space of the corresponding virtual network.

17. The computing system in accordance with claim 10, wherein the multi-gateway virtual machine further includes a compartment module, the compartment module being configured such that it includes an established relationship with each of the multiple gateways, the method further comprising:
an act of causing the compartment module to insert the virtual network identifier into the packet during the act of the multi-gateway virtual machine encapsulating the packet.

18. A method for operating multiple gateways on a multi-gateway virtual machine, each of the multiple gateways operating for a corresponding virtual network, the method comprising the following for each of at least some packets that are sent by the multi-gateway virtual machine:
an act of the multi-gateway virtual machine accessing a packet received from a gateway that is running for a corresponding virtual network, the corresponding virtual network having associated therewith a policy that requires satisfaction of a performance isolation control;
an act of the multi-gateway virtual machine identifying the corresponding virtual network;
an act of the multi-gateway virtual machine encapsulating the packet so as to include a virtual network identifier of the corresponding virtual network; and
an act of the multi-gateway virtual machine dispatching the encapsulated packet.

19. The method in accordance with claim 18, the method further comprising the following for the encapsulated packet dispatched by the multi-gateway virtual machine:
an act of accessing the dispatched encapsulated packet;
an act of identifying the corresponding virtual network, which is the source of the dispatched packet;
an act of decapsulating the dispatched encapsulated packet to discover the destination network address within an address space of the corresponding virtual network; and
an act of delivering the decapsulated packet to a destination entity using the virtual network identifier and the destination network address within the address space of the corresponding virtual network.

20. The computing system in accordance with claim 18, wherein the multi-gateway virtual machine further includes a compartment module, the compartment module being configured such that it includes an established relationship with each of the multiple gateways, the method further comprising:
an act of causing the compartment module to insert the virtual network identifier into the packet during the act of the multi-gateway virtual machine encapsulating the packet.

* * * * *